United States Patent [19]

Shimizu

[11] 4,247,442

[45] Jan. 27, 1981

[54] MOLD AND MILDEW RESISTANT ORGANOPOLYSILOXANE COMPOSITIONS

[75] Inventor: Koji Shimizu, Ichihara, Japan

[73] Assignee: Toray Silicone Company, Ltd., Tokyo, Japan

[21] Appl. No.: 8,666

[22] Filed: Feb. 2, 1979

[30] Foreign Application Priority Data

Mar. 29, 1978 [JP] Japan ................................. 53-35439

[51] Int. Cl.$^3$ ........................... C08K 5/06; C08K 5/47
[52] U.S. Cl. ...................... 260/33.2 SB; 260/45.8 N; 260/45.8 SN; 528/34
[58] Field of Search ............ 106/18.33; 260/45.8 NH, 260/45.8 SN, 33.2 SB

[56] References Cited

U.S. PATENT DOCUMENTS

| | | | |
|---|---|---|---|
| 3,017,415 | 1/1962 | Sarett et al. | 260/302 H |
| 3,410,819 | 11/1968 | Kourtz et al. | 260/45.8 SN |
| 3,845,212 | 10/1974 | Yovich et al. | 260/45.8 NH |
| 3,986,999 | 10/1976 | Sattlegger et al. | 260/45.9 KA |
| 3,998,785 | 12/1976 | Stone | 260/45.8 NH |
| 4,008,351 | 2/1977 | Inoue et al. | 424/114 |
| 4,154,718 | 5/1979 | Miyata et al. | 260/45.7 R |

*Primary Examiner*—Hosea E. Taylor
*Assistant Examiner*—R. A. White
*Attorney, Agent, or Firm*—Robert L. McKellar

[57] ABSTRACT

What is disclosed are organopolysiloxane compositions that are curable to solid elastomers at room temperature and which exhibit mold resistance due to the incorporation of 2-(4-thiazolyl)benzimidazole and certain organic surfactants.

8 Claims, No Drawings

MOLD AND MILDEW RESISTANT ORGANOPOLYSILOXANE COMPOSITIONS

This invention deals with organopolysiloxane compositions which are storable in the absence of water and cure to a solid elastomeric state when exposed to water at room temperature (RTV). More specifically, this invention deals with RTV compositions that exhibit mold resistance for long periods of time after the composition is cured.

It is well-known in the art that organopolysiloxane compositions which are storable in the absence of water and which cure on exposure to water at room temperature to form elastomers can be produced by mixing diorganopolysiloxanes having reactive end groups with organosilicon compounds having at least three hydrolyzable groups per molecule.

The known organopolysiloxane RTV compositions are used widely as elastic sealing materials for applications in gaps of various joints such as the gaps between the joints of building materials, the joints between structural bodies and building materials in buildings, between the bathtub and wall or floor, cracks on tiles in bathrooms, gaps in the bathrooms such as those around the washbasin and those between the washbasin supporting board and the wall, gaps around the kitchen sink and the vicinity, between panels in automobiles, railroad vehicles, airplanes, ships, gaps between prefabricated panels in various electric appliances, machines and other places.

The known organopolysiloxane RTV compositions, however, gradually lose their initial attractive appearance because of dust and other various foreign materials adhering to the surface of the elastomers causing these surfaces to eventually show an extremely unattractive appearance. This is especially true in restrooms, bathrooms and kitchens where there exists conditions of high humidity, poor ventilation, and the conditions which are conductive to the adherence of grime, soap, detergents and foods. Molds find favorite places to propagate. The known organopolysiloxane RTV compositions are not nutrients for molds in themselves, but the grime, soap, synthetic detergents, drinks and foods which adhere to the surfaces of the elastomers serve as nutrients for the propagation of various colored molds.

Furthermore, colors which are discharged from molds are deposited on the elastomers. In this way, the elastomer presents an extremely unpleasant appearance in a short period of time.

The objective of the present invention is to propose organopolysiloxane compositions which are storable in the absence of water, and are curable when exposed to water at room temperature to form elastomers with long-lasting mold resistance, even when they are used to fill gaps in such places as bathrooms, restrooms, kitchens, and other places where conditions favorable for mold propagation exist.

After various investigations, the present inventors discovered that the objective of this invention could be attained with a composition which consists essentially of (A) an organopolysiloxane having the general formula $$R_y Si(OH)_x O_{(4-y)/2}$$

wherein R is a substituted or unsubstituted monovalent hydrocarbon radical, where y has an average value of 1.99–2.01, and x has a value such that the organopolysiloxane has a viscosity of at least 0.05 pa·s at 25° C. (50 cs at 25° C.); (B) an organosilicon compound which has at least three hydrolyzable groups per molecule; (C) 2-(4-thiazolyl)benzimidazole and, (D) an organic surfactant.

Component (A) of this invention is an organopolysiloxane having reactive end groups. Component (A) has the general formula $$R_y Si(OH)_x O_{(4-y)/2}$$

wherein R is a substituted or unsubstituted monovalent hydrocarbon radical where y has an average value of 1.99–2.01 and x has a value such that the viscosity of the organopolysiloxane is at least 0.05 pa·s at 25° C. (50 cSt at 25° C.). A portion of the hydroxyl groups may be replaced by other reactive end groups such as diorganoketoxime groups, carboxyl groups, RNH-groups (where R is as described above), carbamoyl groups, alkoxy groups, or alkoxyalkoxy groups. As indicated by the average value of y being 1.99–2.01, the presence of a small amount of other siloxanes having other degrees of substitution is allowable in the organopolysiloxanes (A).

Examples of the hydrocarbon radical R are alkyl radicals such as methyl, ethyl, isopropyl, and octadecyl; alkenyl radicals such as vinyl and allyl groups; alicyclic hydrocarbon radicals such as cyclopentyl, cyclohexyl, cyclohexenyl groups, and the methylcyclohexyl group; aryl radicals such as phenyl and biphenyl groups; aralkyl radicals such as benzyl, β-phenylethyl, and β-phenylpropyl groups; and alkaryl radicals such as the tolyl group.

Examples of the useful substituted hydrocarbon radicals are haloaryl radicals such as chlorophenyl, perfluoroalkylethyl radicals such as the 3,3,3-trifluoropropyl group and cyanoalkyl radicals such as the β-cyanoethyl group.

At least 50% of the R radicals should be methyl groups. Of the other R radicals which are allowed to be present, preferred are phenyl and vinyl groups.

The R radicals on the silicon atoms may be identical or different. The organopolysiloxane can consist of homopolymers of the same or different degree of polymerization, a mixture of various homopolymers, a copolymer, or a mixture of various copolymers. The viscosity is desired to be within a range of 0.05–500 pa·s at 25° C. (50–500,000 cSt/25° C.).

Component (B) of this invention, the organosilicon compounds which have at least 3 hydrolyzable groups per molecule, are those which have been used for producing organopolysiloxane base compositions which are storable in the absence of water and are cured in the presence of water at room temperature to form an elastomer.

These organosilicon compounds can be silanes having the following general formulae $$R_a Si(ON=CR_2)_{(4-a)}$$

where R is the same as defined previously and a is 0 or 1, or their partial hydrolysis products;

$$R_a Si(OCOR)_{(4-a)}$$

where R is the same as defined previously and a is 0 or 1, or their partial hydrolysis products;

where R is the same as defined previously, R' is a hydrogen or the same as R, and a is 0 or 1, or their partial hydrolysis products;

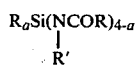

where R and R' are the same as defined above and a is 0 or 1, or their partial hydrolysis product and

where R is the same as defined above, and a is 0 or 1, or their partial hydrolysis products and silanes or siloxanes which have at least 3 $R_2NO-$ groups per molecule.

Specific examples of these organosilicon compounds are: methyltrimethoxysilane, methyltri(ethylmethoxy)silane, N-aminoethylaminopropyltriethoxysilane, methyltri(N,N-diethylaminoxy)silane, methyltri(methyl ethyl ketoxime)silane, methyltri(dimethyl ketoxime)silane, vinyltri(methyl ethyl ketoxime)silane, vinyltri(dimethyl ketoxime)silane, methyltriacetoxysilane, ethyltriacetoxysilane, vinyltriacetoxysilane, methyltri(n-butylamino)silane, methyltri(cyclohexylamine)silane, methyltri(N-methylacetamide)silane, methyltri(N-butylacetamide)silane, methyltri(N-cyclohexylacetamide)silane, and siloxanes expressed by the formula

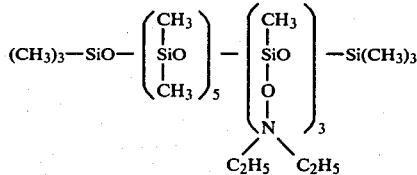

The organosilicon compounds (B) are generally used in such an amount that at least 1 mole of the silicon compound exists per 1 g equivalent of the reactive end groups of the organopolysiloxane (A). More specifically, the organosilicon compound (B) is generally used in 0.2 to 30 parts by weight, or more desirably, 1 to 10 parts by weight relative to 100 parts by weight of component (A).

Component (C) of this invention, 2-(4-thiazolyl)-benzimidazole has the reputation of being a harmless and effective mold-preventive agent, and is used with foods, rubber, plastics, paper, rubber latices and emulsions. However, when an organopolysiloxane RTV composition containing this material is used to seal joints and gaps in such humid places as bathrooms, restrooms and kitchens, the mold-preventive effect, although observable, is found to be insufficient. However, when component (D) is included in the inventive organopolysiloxane composition with component (C) a remarkable mold resistance is observed, and the effect lasts for a long period of time.

The amount of 2-(4-thiazolyl)benzimidazole used in this invention as a mold-preventing agent is 0.1–10 parts by weight, and preferably, 0.2–5 parts by weight relative to 100 parts of component (A) of this invention.

Any of the following surfactants can be used as component (D): anionic surfactants, cationic surfactants, amphoteric surfactants, nonionic surfactants, and mixtures of these. Especially preferable is the use of a nonionic surfactant since it does not affect component (B) in any way.

Examples of the anionic surfactants that can be used in this invention include fatty acid salts $R^1COOM$, higher alcohol sulfuric acid ester salts $R^1OSO_3M$, liquid fatty oils, sulfuric acid ester salts $R^1(OSO_3M)COOR^2$, sulfates of aliphatic amines and aliphatic amides $R^1CONHR^3CH_2CH_2OSO_3M$, aliphatic acid alcohol phosphoric acid ester salts $R^1OP(OM)_2$, sulfonates of dibasic fatty acid esters

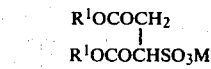

fatty acid amide sulfonates $R^1CONR^2CH_2CH_2SO_3M$, alkyl arylsulfonates

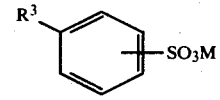

and formalin-condensated naphthalinesulfonates

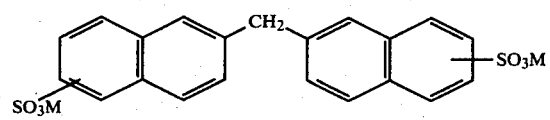

For all component (D) compounds, $R^1$ and $R^2$ are monovalent organic groups or hydrogen atoms, $R_3$ is a divalent organic group, and M represents Na, K or $NH_4$.

Examples of cationic surfactants that can be used in this invention include aliphatic amine salts having the formula

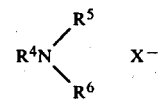

quaternary ammonium salts having the formula

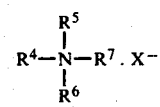

and alkylpyridinium salts

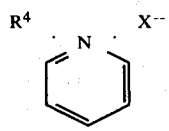

where $R^4$ and $R^7$ are monovalent organic groups, $R^5$ and $R^6$ are hydrogens or monovalent organic groups, and X is HCl, $CH_3COOH$, Cl, Br or OH. Examples of amphoteric surfactants that can be used in this invention are classified, in terms of the anions of the activation group, into the carboxylic acid type, the sulfuric acid ester type, the sulfonic acid type and the phosphoric acid ester type. Any of these can be used. Examples of the carboxylic type amphoteric surfactants are those having the formulae $R^4NHCH_2COOH$,

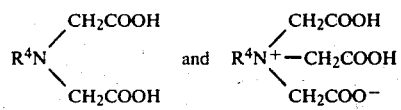

Examples of the sulfuric acid ester type are $R^4NHCH_2CH_2OSO_3M$ and $R^4CONHCH_2CH_2NHCH_2$—$CH_2OSO_3M$. Examples of the sulfonic acid type are $R^4NHCH_2CH_2SO_3M$ and those having the formula

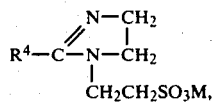

and examples of the phosphoric acid ester types are those having the formula

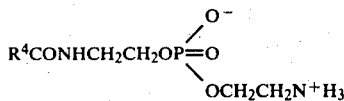

where $R^4$ and M are the same as previously defined.

Examples of nonionic surfactants are polyoxyethylene alkyl ethers such as $R^4O(C_2H_4O)_nH$; polysiloxane polyoxyalkylene copolymers such as

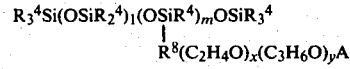

polyoxyethylene alkylphenol ethers

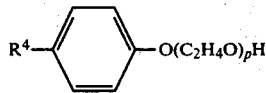

polyoxyethylene alkyl esters $R^4COO(C_2H_4O)_pH$, sorbitan alkyl esters

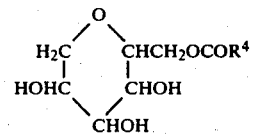

and polyoxyethylene sorbitan alkyl esters

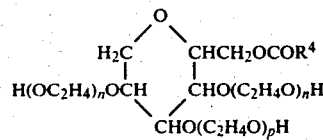

where $R^4$ is the same as defined previously, $R^8$ is —O— or —$CH_2$—$CH_2$—$CH_2O$—, A is an alkyl group, an acyl group or a hydrogen atom, l and m are integers equal to or greater than 1, p and X are integers equal to or greater than 1, and y is 0 or an integer equal to or greater than 1.

Although surfactants alone are nutrients for molds, when they are used in this invention with the organopolysiloxane compositions containing component (C), 2-(4-thiazolyl)benzimidazole, these surfactants contribute remarkably to enhance the mold resistance of the compositions. Therefore, the surfactants are the component which characterizes this invention.

The reason why 2-(4-thiazolyl)benzimidazole, used with a surfactant, demonstrates remarkable mold resistance of the organopolysiloxane elastomer characteristic to this invention is not known but it is theorized that 2-(4-thiazolyl)benzimidazole, which is insoluble in water by itself, becomes wettable when a small amount of surfactant is added. Accordingly, when water starts to permeate the organopolysiloxane elastomer, 2-(4-thiazolyl)benzimidazole easily diffuses into the grime, soap, drinks and foods, and other mold nutrients which adhere to the surface of the elastomer, thus exhibiting a greater mold resistance.

In the organopolysiloxane compositions of this invention, other substances such as those which are used in the conventional organopolysiloxane RTV compositions can be used as additives. The examples of these substances are such fillers and condensation catalysts as the carboxylic acid salts of a dialkyltin, alkyl titanate, organosiloxy titanium compounds, pigments, dyes, thermal stabilizing agents, solvents, adhesion-enhancing agents, chain extending agents for component (A), softening agents, fire-retardants, organopolysiloxane resins and organic resins.

The fillers which are used in the conventional organopolysiloxane RTV compositions can be used in the composition of this invention. Of these fillers, examples of reinforcing fillers are fumed silica having a large surface area, precipitated silica, hydrophobicized fumed silica, hydrophobicized precipitated silica, carbon black, titanium dioxide, ferric oxide, aluminum oxide, zinc oxide, and other metal oxides. Nonreinforcing fillers useful in this invention are quartz powder having a small surface areas, diatomaceous earth, calcium silicate, zirconium silicate, talc and bentonite. Fibrous fillers useful in this invention are asbestos glass fiber or organic fibers. The amount of the filler used is selected as desired within a range not interfering with the objective of the present invention.

In combining the components of the organopolysiloxane composition of this invention, dispersing 2-(4-thiazolyl)benzimidazole and the surfactant as homogeneously as possible is important. Examples of the precedure are as follows. For example, 2-(4-thiazolyl)-benzimidazole and the surfactant are mixed with a small amount of the organopolysiloxane (A). These are then mixed homogeneously with a three-roll mixer and used as a master paste. This master paste is added to the organopolysiloxane (A) simultaneously with the organosilicon compounds (B) and filler in the absence of water. The composition then is mixed until homogeneity is attained. In another method, 2-(4-thiazolyl)benzimidazole and the filler are added to the organopolysiloxane (A) and mixed thoroughly until homogeneity is attained. Next, the organosilicon compound (B) and the surfactant are added in the absence of water, and mixing is carried out until homogeneity is attained. In still another method, 2-(4-thiazolyl)benzimidazole and the surfactant are dissolved in an organic solvent, and the other components are then added to the solution.

Experimental examples are described below. In these examples, the term "parts" means "parts by weight" without exception.

EXAMPLE 1

A linear dimethylpolysiloxane (100 parts) having silanol groups at both ends and a viscosity of 12 pa·s at 25° C. (12,000 cSt at 25° C.) and fumed silica (12 parts) having a surface area of 200 m$^2$/g were thoroughly mixed together. Next, 2-(4-thiazolyl)benzimidazole (1.0 parts) was added to this mixture and composition was mixed until a homogeneous dispersion was achieved. After this, methyltri(methyl ethyl ketoxime)silane (10 parts) dibutyltin dioctoate (0.2 parts) and Nonipol 95 (0.2 parts; polyoxyethylene nonylphenyl ether manufactured by Sanyo Chemical Industries, Ltd. Japan) as the surfactant were added in the absence of water. The mixing was quickly carried out until homogeneity was attained. The obtained mixture was sealed into an aluminum tube as composition (A).

Next, compositions were prepared as controls consisting of composition (B), which was the above-mentioned composition (A) minus the surfactant Nonipol 95, and composition (C), which was composition (A) minus 2-(4-thiazolyl)benzimidazole and Nonipol 95, and each of these were sealed into aluminum tubes.

In a bathroom located in a building maintained at 26°±5° C., and with a relative humidity of 60±6%, the above-mentioned compositions (A), (B) and (C) were used to fill gaps between an enameled bathtub and tiled walls, as well as the floor. These compositions (A), (B), and (C) were thoroughly cured in 3 days to assume an appearance of an elastomer with a beautiful opaque milky white color. The surface of these elastomers from compositions (A), (B) and (C) were checked 3 months, 6 months, 1 year, and 2 years after the applications. Composition (A) did not show any mold even after 2 years, presenting as beautiful an appearance as it had initially. On composition (B), partial generation of a dark brown mold was observed after a year. After 2 years, the mold was found to cover almost the total surface of the elastomer. With composition (C), a dark brown mold was found almost everywhere on the surface of the elastomer only 3 months after the application, resulting in a marked deterioration in the appearance.

Next, more of the above mentioned uncured compositions (A), (B) and (C) were formed into sheets 0.2 cm in thickness. These sheets were left standing at room temperature to be cured to assume an elastomer state. These sheets were then cut into specimens of a size 3 cm×4 cm.

In petri dishes, 7 cm in diameter, 3 malt agar plate culture media were prepared. The previously prepared 3 kinds of specimens were then placed on these culture media, one on each medium, and lightly pressed and immersed. Separately, mold spores purely cultured according to the specification of JIS Z-2911 were dispersed in Aerosol OT 0.005% aqueous solution, and this was uniformly sprayed over the plate culture media in which the specimens were placed. The petri dishes were covered and left standing for 2 months under conditions of 28°±2° 1 C. and a relative humidity of 98% or higher. The specimens were checked after 1 month and 2 months for the state of molding.

The petri dish which held the specimen of composition (A) did not show any mold after 2 months, maintaining its initial beautiful appearance. In the petri dish holding the composition (B) specimen, the generation of a dark brown mold and a white mold was observed after 2 months on a part of the specimen and in areas of the medium mostly apart from the specimen. With the petri dish holding the specimen of composition (C), the growth of a dark brown mold and a white mold was observed after one month on the whole upper surface of the culture medium, on the total lower surface of the specimen, and on almost the total upper surface of the specimen, showing a quite marked loss of original good appearance.

EXAMPLE 2

2-(4-thiazolyl)benzimidazole (20 parts) and Emalmin 40 (10 parts; a higher alcohol ethylene oxide adduct manufactured by Sanyo Chemical Industries, Ltd. Japan) as the surfactant were added to a linear dimethylpolysiloxane (70 parts) having silanol groups at both ends and having a viscosity of 18 pa·s at 25° C. (18,000 cSt at 25° C). They were mixed, and dispersed homogeneously through a three-roll mixer into a master paste.

Next, fumed silica (10 parts) with a surface area of 300 m$^2$/g and fine powdered quartz (5 parts) were added to a linear dimethylpolysiloxane (100 parts) with silanol groups at both ends and having a viscosity of 18 pa·s at 25° C. (18,000 cSt at 25° C.) After they were thoroughly mixed, the above-mentioned master paste (10 parts) was added to this mixture and the resulting composition was thoroughly mixed. Methyltri(N-methylacetamide)silane (7.0 parts) was then added, and the composition was quickly mixed in the absence of water until homogeneity was achieved. This was then sealed into an aluminum tube as composition (D).

Next, a control was prepared, composition (E), which consisted of above-mentioned composition (D) minus the master paste, and was sealed into an aluminum tube.

In a kitchen, in a building of reinforced concrete, not exposed to direct sunlight with poor ventilation, the above-mentioned compositions (D) and (E) were used to fill small gaps around the dishwashing area. The compositions (D) and (E) were sufficiently cured in 3 days to assume an elastomer state showing an attractive off-white color. The surfaces of the elastomers were observed 6 months, one year, and 2 years after the application. Composition (D) maintained its initial beautiful appearance even after 2 years without developing any mold. Composition (E) showed scattering generations of dark brown mold in 6 months. After a year, the dark brown mold was found everywhere, with a striking deterioration of the initial beautiful appearance.

EXAMPLE 3

2-(4-thiazolyl)benzimidazole (20 parts) was added to a linear dimethylpolysiloxane (80 parts) with silanol groups at both ends and having a viscosity of 18 pa·s at 25° C. (18,000 cSt at 25° C.) and mixed. The mixture was passed through a three-roll mixer and dispersed homogeneously into a master paste.

Next, fumed silica (10 parts) with a surface area of 300 m$^2$/g and fine powdered quartz (5 parts) were added to a linear dimethyl polysiloxane (100 parts) with silanol groups at both ends and having a viscosity of 18 pa·s at 25° C. (18,000 cSt at 25° C.) and the resulting composition was thoroughly mixed. To this mixture, the 2-(4-thiazolyl)-benzimidazole master paste (10 parts) was added and the resulting composition was thoroughly mixed. Next methyltri(N,N-dimethylamino)silane (7.0 parts) and Emulgen PP-150 (2 parts; oxyethylene-oxypropylene block copolymer manufactured by Kao Atlas K.K. Japan) as the surfactant were further added in the absence of water, and the composition was quickly mixed until homogeneity was attained. This was then sealed into an aluminum tube as composition (F).

Next, a control was prepared, composition (G), which consisted of composition (F) minus the 2-(4-thiazolyl)benzimidazole master paste and the surfactant Emulgen PP-150, and was sealed into an aluminum tube.

A mold resistance test was conducted in petri dishes in the same manner as described in Example 1, and the observations were made for the state of molding after 1 month and after 2 months. The petri dish containing composition (F) did not show any sign of mold whatsoever, maintaining its original beautiful appearance. The petri dish containing the composition (G) specimen showed the propagation of a dark brown mold and a white mold on the whole upper surface of the culture medium and the whole lower surface of the specimen as well as almost the whole area of the upper surface of the specimen, with a marked loss of the original beautiful appearance.

That which is claimed is:

1. An organopolysiloxane composition which is curable to a solid elastic state which consists essentially of
   (A) an organopolysiloxane having the general formula

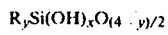
   $R_y Si(OH)_x O_{(4-y)/2}$ wherein R is a substituted or unsubstituted monovalent hydrocarbon radical, where y has an average value of 1.99–2.01 and x has a value such that the organopolysiloxane has a viscosity of at least 0.05 pa·s at 25° C.;
   (B) an organosilicon compound which has at least three hydrolyzable groups per molecule;
   (C) 2-(4-thiazolyl)benzimidazole and,
   (D) an organic surfactant.

2. An organopolysiloxane composition which is curable to a solid elastic state as claimed in claim 1 which consists essentially of
   (A) 100 parts by weight of an organopolysiloxane having the general formula

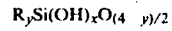
   $R_y Si(OH)_x O_{(4-y)/2}$ wherein R is a substituted or unsubstituted monovalent hydrocarbon radical, where y has an average value of 1.99–2.01 and x has a value such that the organopolysiloxane has a viscosity of at least 0.05 pa·s at 25° C.;
   (B) 0.2–30 parts by weight based on the weight of (A) of an organosilicon compound which has at least three hydrolyzable groups per molecule;
   (C) 0.1–10 parts by weight based on the weight of (A) of 2-(4-thiazolyl)benzimidazole and,
   (D) 0.05–10 parts by weight based on the weight of (A) of an organic surfactant.

3. An organopolysiloxane composition as claimed in claim 2 wherein there is present 100 parts of (A); 1–10 parts by weight of (B); 0.2–5 parts by weight of (C) and 0.1–5 parts by weight of (D).

4. A composition as claimed in claim 3 wherein (B) is a silane of the general formula

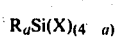
   $R_a Si(X)_{(4-a)}$ wherein X is selected from a group consisting of —ON=CR$_2$, —OCOR, —NRR',

and —OR wherein R is a substituted or unsubstituted monovalent hydrocarbon radical and a has a value of 0 or 1.

5. A composition as claimed in claim 3 wherein (B) is a siloxane having the formula

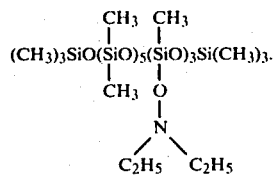

6. A composition as claimed in claim 3 wherein (D) the organic surfactant is selected from a group consisting of anionic, cationic, amphoteric, nonionic surfactants and mixtures thereof.

7. A composition as claimed in claim 6 wherein (D) is a polysiloxane-polyoxyalkylene copolymer nonionic surfactant.

8. A composition as claimed in claim 6 wherein (D) is polyoxyethylene-nonylphenyl ether.

* * * * *

UNITED STATES PATENT AND TRADEMARK OFFICE
CERTIFICATE OF CORRECTION

PATENT NO. : 4,247,442
DATED : January 27, 1981
INVENTOR(S) : Koji Shimizu

It is certified that error appears in the above-identified patent and that said Letters Patent are hereby corrected as shown below:

In Column 1, line 40; the word reading "conductive" should read "conducive".

In Column 6, line 53; the line reading "dure are as follows. For Example, 2-(4-thiazolyl)-ben-" should read "dure are as follows. For Example, 2-(4-thiazolyl)ben-".

In Column 7, line 66; the line reading "conditions of 28°±2° 1 C. and a relative humidity of" should read "conditions of 28°±2°C. and a relative humidity of".

In Column 9, line 34; the formula reading "$R_y Si(OH)_x\, ^{(4\ y)/2}$" should read "$R_y Si(OH)_x O_{(4-6)/2}$".

In Column 9, line 51; the formula reading "$R_y Si(OH)_x O_{(4\ y)/2}$" should read "$R_y Si(OH)_x O_{(4-y)/2}$".

UNITED STATES PATENT AND TRADEMARK OFFICE
CERTIFICATE OF CORRECTION

PATENT NO. : 4,247,442
DATED : January 27, 1981
INVENTOR(S) : Koji Shimizu

It is certified that error appears in the above-identified patent and that said Letters Patent are hereby corrected as shown below:

In Column 10, line 20; the formula reading "$R_a Si(X)_{(4\ a)}$" should read "$R_a Si(X)_{(4-a)}$".

Signed and Sealed this

Tenth Day of November 1981

[SEAL]

Attest:

Attesting Officer

GERALD J. MOSSINGHOFF

Commissioner of Patents and Trademarks